United States Patent
Yoo et al.

(10) Patent No.: US 11,446,829 B2
(45) Date of Patent: Sep. 20, 2022

(54) ROBOT ARM EXTENSION DEVICE AND ROBOT INCLUDING SAME

(71) Applicant: Samsung Electronics Co., Ltd., Gyeonggi-do (KR)

(72) Inventors: Jae Chun Yoo, Gyeonggi-do (KR); Seung Hoon Shin, Gyeonggi-do (KR); Igor Ivanov, Gyeonggi-do (KR); Suk Hyun, Gyeonggi-do (KR); Kyung Shik Roh, Gyeonggi-do (KR); Si Ho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/754,973

(22) PCT Filed: Nov. 2, 2018

(86) PCT No.: PCT/KR2018/013232
§ 371 (c)(1),
(2) Date: Apr. 9, 2020

(87) PCT Pub. No.: WO2019/093718
PCT Pub. Date: May 16, 2019

(65) Prior Publication Data
US 2021/0197408 A1  Jul. 1, 2021

(30) Foreign Application Priority Data

Nov. 8, 2017 (KR) .................. 10-2017-0148021

(51) Int. Cl.
*B25J 18/02* (2006.01)
*B25J 9/10* (2006.01)

(52) U.S. Cl.
CPC .............. *B25J 18/02* (2013.01); *B25J 9/102* (2013.01)

(58) Field of Classification Search
CPC . B25J 18/02; B25J 9/102; B25J 9/0093; B25J 9/041; B25J 9/10; B25J 9/104;
(Continued)

(56) References Cited

U.S. PATENT DOCUMENTS

| | | | |
|---|---|---|---|
| 2,375,462 A * | 5/1945 | Bender | E02B 7/36 52/108 |
| 6,419,603 B1 * | 7/2002 | Grasl | B66F 3/06 474/148 |

(Continued)

FOREIGN PATENT DOCUMENTS

| | | | | |
|---|---|---|---|---|
| DE | 102007054730 A1 * | 5/2009 | | B65G 23/06 |
| EP | 0526120 A1 * | 2/1993 | | F22B 37/483 |

(Continued)

OTHER PUBLICATIONS

PCT/ISA/210 Search Report dated Feb. 1, 2019 issued on PCT/KR2018/013232, pp. 6.

(Continued)

*Primary Examiner* — Bobby Rushing, Jr.
*Assistant Examiner* — T. Scott Fix
(74) *Attorney, Agent, or Firm* — The Farrell Law Firm, P.C.

(57) ABSTRACT

The objective of the present invention is to provide: a robot arm extension device capable of adjusting an operating radius according to the operation environment and requirements of a robot in industrial sites; and a robot including the robot arm extension device. The robot arm extension device according to the present invention comprises: a housing; an adapter formed on one side of the housing and connected to the robot; a length extending part embedded in the housing and withdrawn from or inserted into the housing; and a driving part for providing the driving power of the length extending part.

9 Claims, 15 Drawing Sheets

(58) Field of Classification Search
CPC .......... F16G 13/20; F16G 13/18; F16G 13/22; F16G 13/24; F16G 13/02; F16G 15/04; F16G 15/06; F16G 15/12; F16G 15/14; F22B 37/483; F28G 15/04; B65B 35/44
USPC .......... 74/490.01, 665 GE, 89.2, 37; 174/69; 138/120; 474/202, 204, 206, 205; 254/1, 254/311; 52/108

See application file for complete search history.

(56) References Cited

U.S. PATENT DOCUMENTS

| | | | |
|---|---|---|---|
| 7,270,619 B2 | 9/2007 | Bourc'His | |
| 9,656,394 B2* | 5/2017 | Lin | B25J 15/0408 |
| 2004/0157691 A1* | 8/2004 | Olmsted | F16H 7/06 |
| | | | 474/152 |
| 2004/0220004 A1* | 11/2004 | Bourc'His | F16H 19/0636 |
| | | | 474/152 |
| 2008/0200294 A1* | 8/2008 | Scott | B66D 1/54 |
| | | | 474/230 |
| 2009/0084075 A1* | 4/2009 | May | F16G 13/20 |
| | | | 53/534 |
| 2010/0071734 A1* | 3/2010 | Kim | F22B 37/005 |
| | | | 134/167 R |
| 2012/0024091 A1 | 2/2012 | Kawabuchi et al. | |
| 2012/0198809 A1* | 8/2012 | Scolari | F16G 13/20 |
| | | | 59/84 |
| 2013/0068061 A1* | 3/2013 | Yoon | B25J 18/02 |
| | | | 901/25 |
| 2017/0259435 A1 | 9/2017 | Yoon | |
| 2017/0275836 A1* | 9/2017 | Dong | E01F 13/046 |
| 2018/0207812 A1* | 7/2018 | Yoon | B25J 9/0027 |
| 2018/0216703 A1* | 8/2018 | Etori | F16G 13/20 |

FOREIGN PATENT DOCUMENTS

| | | | |
|---|---|---|---|
| JP | 2000153490 | | 6/2000 |
| JP | 2001260070 | | 9/2001 |
| JP | 5317362 | | 10/2013 |
| JP | 5435679 | | 3/2014 |
| JP | 2016101647 | | 6/2016 |
| JP | 2016209970 A | * | 12/2016 |
| KR | 1020150134613 | | 12/2015 |
| WO | WO-9617695 A1 | * | 6/1996 ............ B65H 75/36 |

OTHER PUBLICATIONS

PCT/ISA/237 Written Opinion dated Feb. 1, 2019 issued on PCT/KR2018/013232, pp. 7.

* cited by examiner

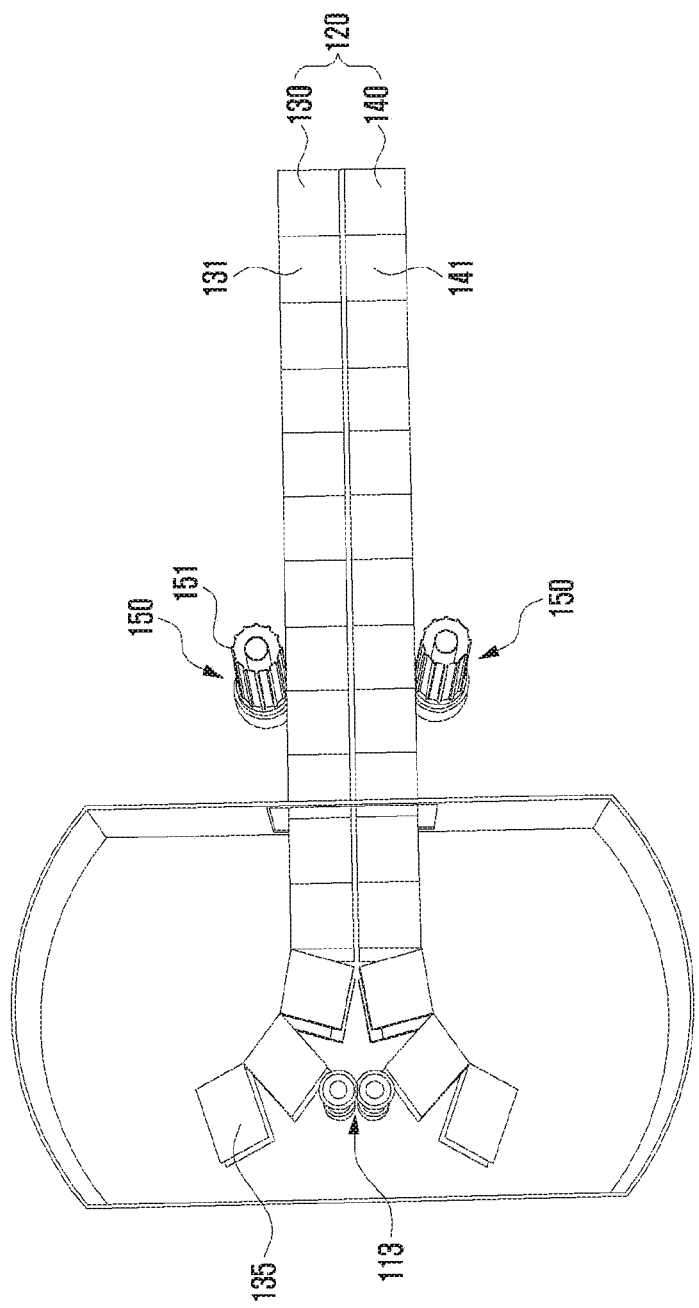

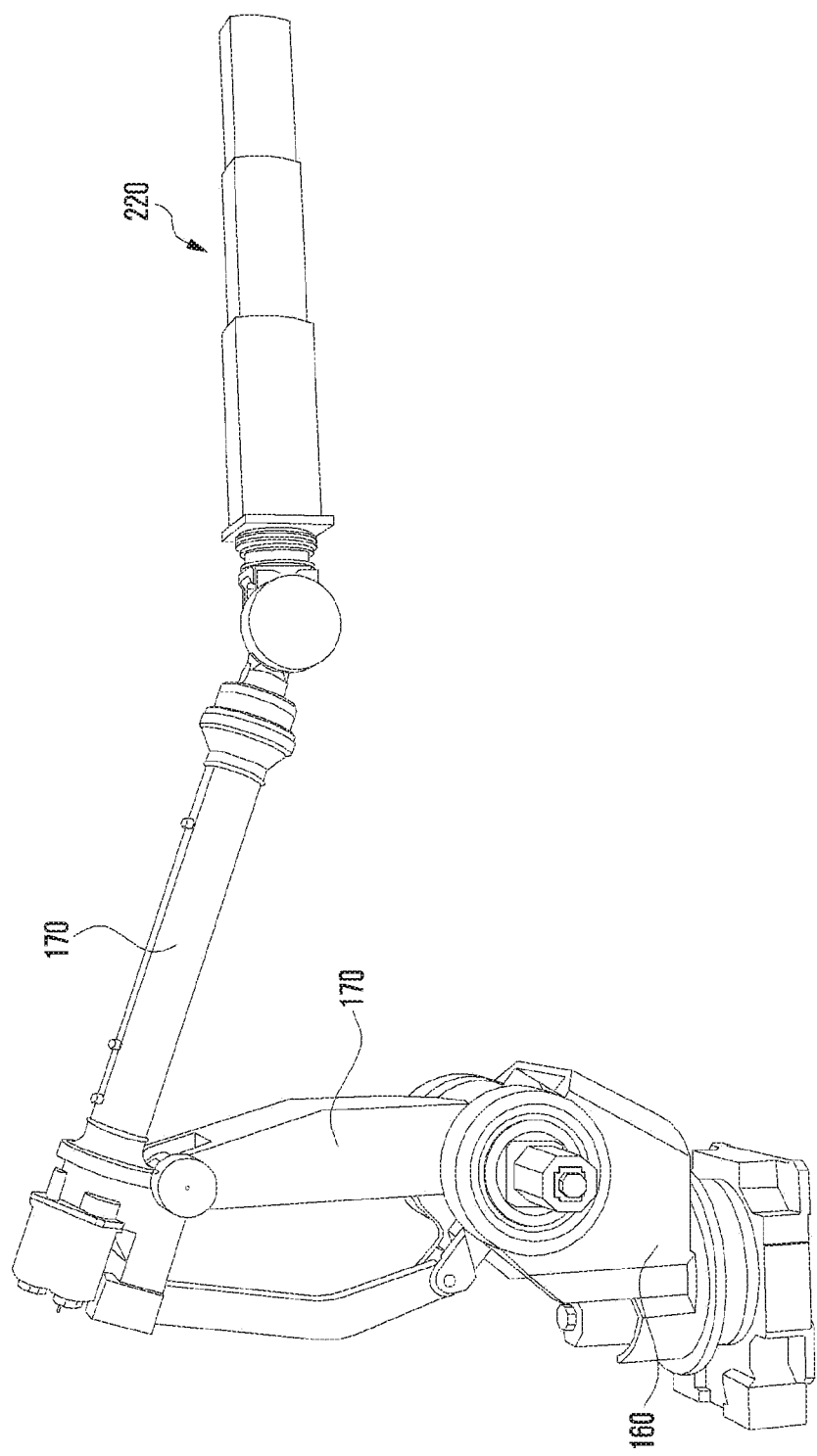

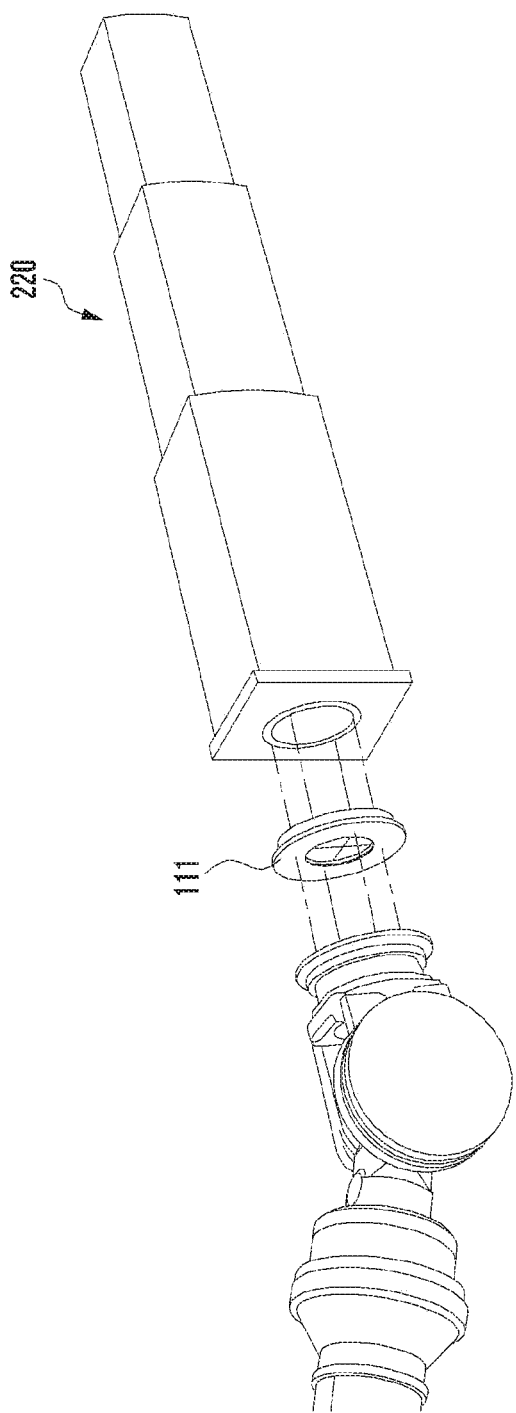

ROBOT ARM EXTENSION DEVICE AND ROBOT INCLUDING SAME

PRIORITY

This application is a National Phase Entry of PCI International Application No. PCT/KR2018/013232 which was filed on Nov. 2, 2018, and claims priority to Korean Patent Application No. 10-2017-0148021, which was filed on Nov. 8, 2017, the content of each of which is incorporated herein by reference.

BACKGROUND

1. Field

The disclosure relates to a robot arm extension device for extending the working radius of various operational robots.

2. Related Art

Robots that play a variety of roles in industrial sites vary in speed, precision, and size depending on their uses.

In particular, as the load applied to the end effector increases or the working radius increases, the length and number of segments of the robot arm tend to increase in proportion and various components such as a motor and a speed reducer for driving the robot arm also tend to become larger in size and higher in performance.

However, in industrial fields, there may be cases where the load on the end effector is small but a wide working radius is required, and, on the contrary, there may be cases where a wide working radius is not necessary but a high endurance load is required for the end effector.

When choosing a commercially available robot to meet these requirements, it may have to use a more expensive robot or a higher performance robot than necessary. Various studies are in progress to solve this problem.

SUMMARY

The disclosure can increase the working radius of a robot through optimization corresponding to the operating environment and conditions in the industrial site.

According to an embodiment of the disclosure, there is provided a robot arm extension device. The robot arm extension device may include: a housing; an adapter formed at one side of the housing and connected to the robot; a length extension part embedded in the housing and configured to be pulled out of or pulled into the housing; and a driving part configured to provide a driving force for pulling the length extension part out of or into the housing.

According to an embodiment of the disclosure, there is provided a robot. The robot may include: a main body; a robot arm connected to the main body and configured to perform rotational motion or translational motion; a housing connected to the end of the robot arm through an adapter; a length extension part embedded in the housing and configured to be pulled out of or pulled into the housing; and a driving part configured to provide a driving force to the length extension part.

Without using expensive or high-performance robots, it is possible to adjust the working radius of a robot according to the operating environment and conditions in the industrial site.

BRIEF DESCRIPTION OF DRAWINGS

FIGS. 3A to 4B schematically show the internal structure of the robot arm extension device according to an embodiment of the disclosure.

FIG. 6 illustrates a state where a robot arm extension device is mounted on a robot according to another embodiment of the disclosure.

FIG. 7 illustrates a coupling portion between the robot arm extension device and the robot according to another embodiment of the disclosure.

DETAILED DESCRIPTION

Figure 1:
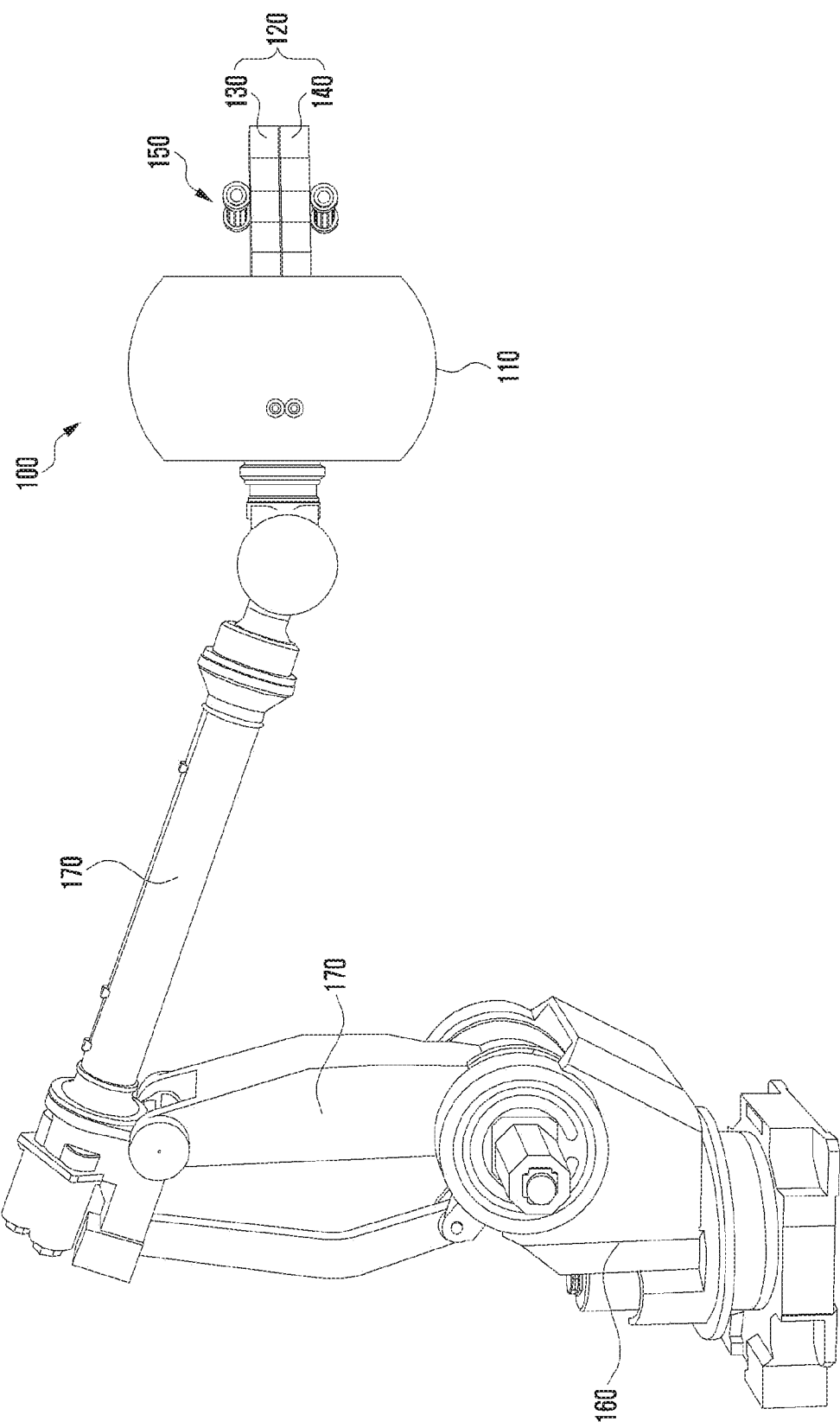
FIG. 1 illustrates a state, where a robot arm extension device is mounted on a robot according to an embodiment of the disclosure.

Hereinafter, various embodiments will be described with reference to the accompanying drawings. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via the other element (e.g., a third element).

In the following description, "configured to" could be used to "suitable for", "with the ability to", "modified to", "made to", "to do", or "designed to" in hardware or software interchangeably in accordance with circumstances. In some situations, the expression "device configured to" may mean that the device "can" along with other devices or components. For example, the phrase "processor configured (or configured to) perform A, B, and C" may mean a dedicated processor (e.g., an embedded processor) to perform its operation, or a general purpose processor (e.g., a CPU or an application processor) capable of performing the corresponding operations by executing one or more software programs stored in a memory device.

FIG. 1 illustrates a state where a robot arm extension device 100 is mounted on a robot according to an embodiment of the disclosure.

With reference to FIG. 1, the robot according to an embodiment of the disclosure may largely include a main body 160 and a robot arm 170. The main body 160 may serve as a center for driving the robot. The main body 160 may be fixed to the ground or may be movable. The main body 160 may receive power for driving and transmit the power to the robot arm 170 and the end effector (not shown) mounted on the robot arm 170 to perform various tasks.

The end effector (not shown) is a part that performs tasks according to the use of the robot, and may be in various forms depending on the types of tasks, such as a gripper for mounting electronic components or the like, and a welder for welding.

The robot arm 170 serves to place the end effector (not shown) at the position of the task to be performed. The working radius and the precision of operation may vary depending on the number and length of segments of the robot arm 170.

Figure 2:
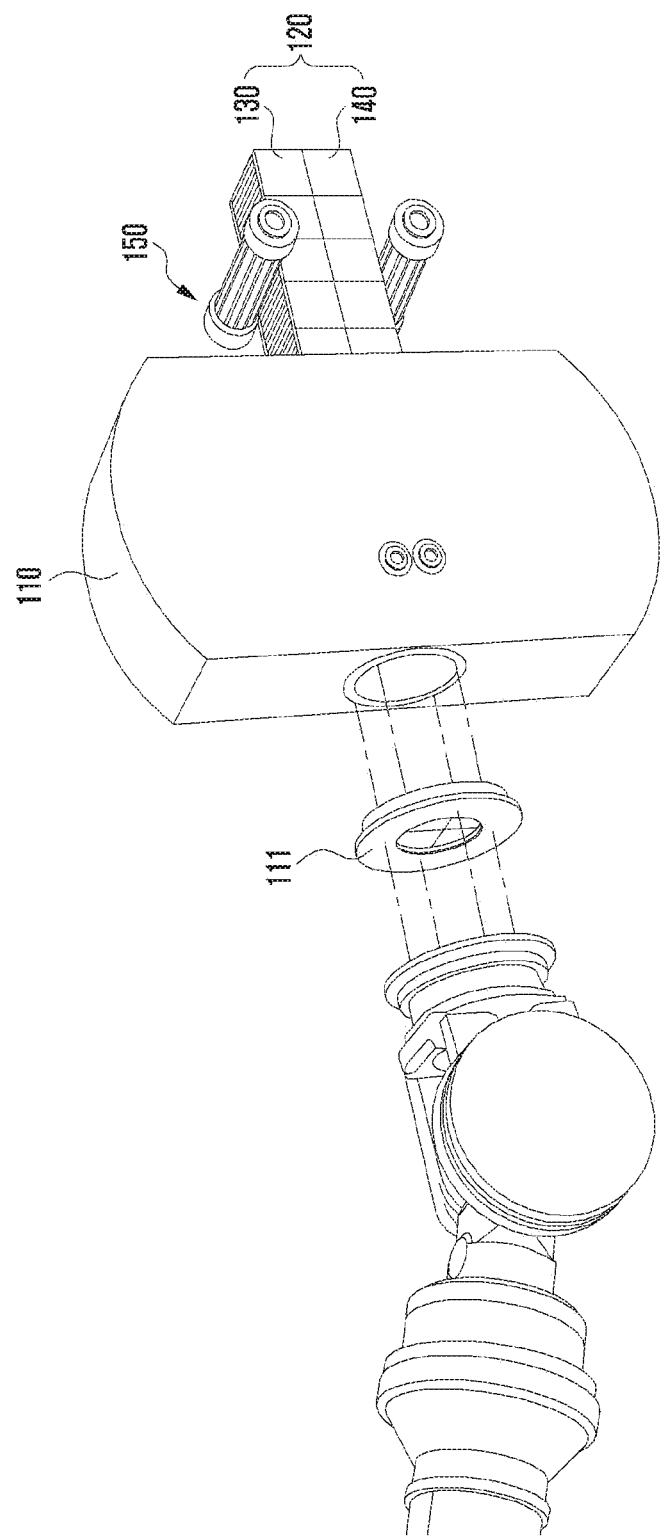
FIG. 2 illustrates a coupling portion between the robot arm extension device and the robot according to an embodiment of the disclosure.

FIG. 2 illustrates a coupling portion between the robot arm extension device 100 (in FIG. 1) and the robot according to an embodiment of the disclosure.

With reference to FIG. 2, the robot arm extension device 100 (in FIG. 1) according to an embodiment of the disclosure may be disposed between the end of the robot arm 170 and the end effector (not shown) to increase the working radius of the robot.

In one embodiment of the disclosure, the robot arm extension device 100 (in FIG. 1) may be connected to the end of the robot arm 170 through a component such as an adapter 111. The adapter 111 may be formed in various ways corresponding to the shape of the end of the robot arm 170 where it is mounted. The adapter 111 may be formed as a separate component or may be integrally formed with the housing 110 of the robot arm extension device 100 (in FIG. 1).

Figure 3A:
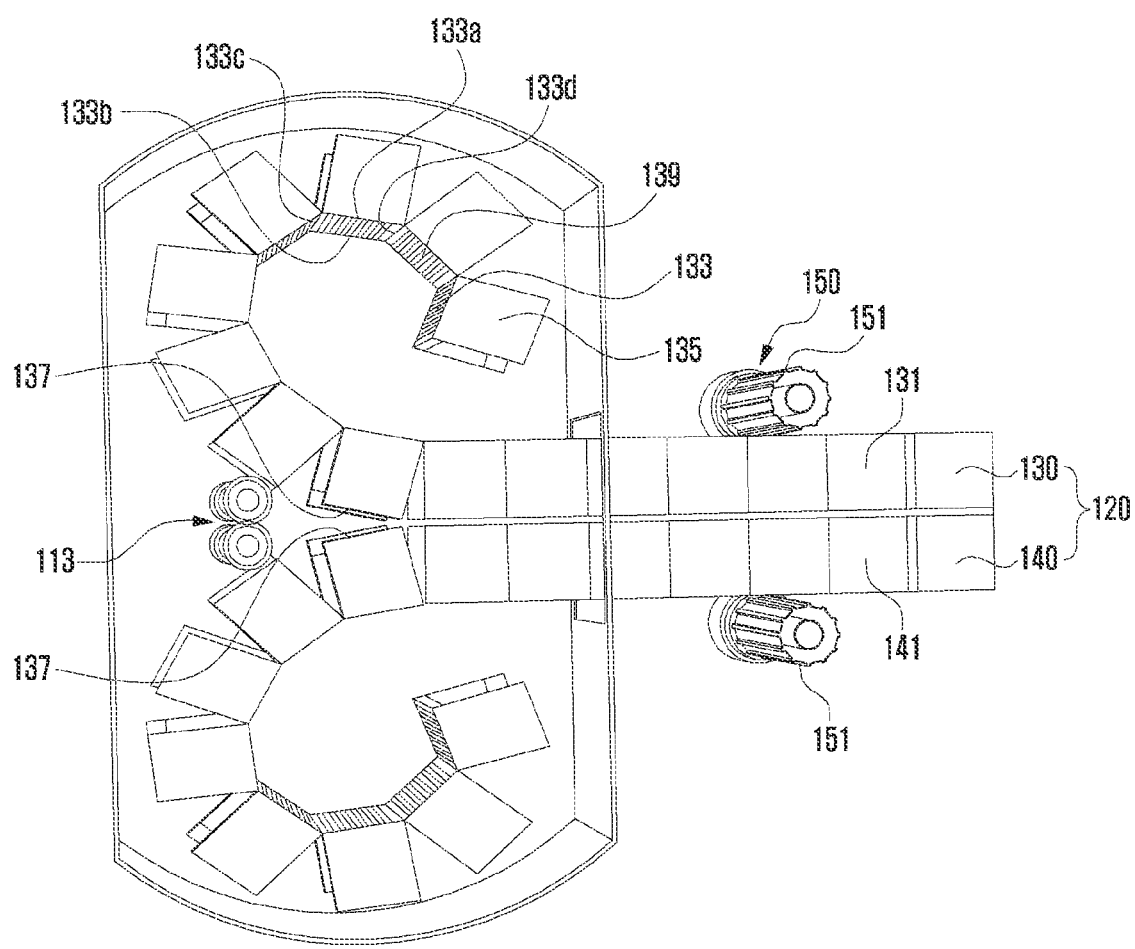

FIGS. 3A to 4B schematically show the internal structure of the robot arm extension device 100 (in FIG. 1) according to an embodiment of the disclosure, FIG. 3A illustrates a state where the length extension part 120 is wound inside the housing 110 (in FIG. 2), and FIG. 3B illustrates a state where the length extension part 120 is pulled out of the housing 110 (in FIG. 2) to thereby extend the length of the robot arm 170.

With reference to FIGS. 3A and 3B, in one embodiment of the disclosure, the robot arm extension device 100 (in FIG. 1) may include a housing 110 (in FIG. 2), an adapter 111 (in FIG. 2), a length extension part 120, and a driving part 150.

The housing 110 (in FIG. 2) may configure the robot arm extension device 100 (in FIG. 1) as a module to facilitate mounting at the end of the robot arm 170. As described above, the adapter 111 (in FIG. 2) may be formed in various ways according to the shape of the end of the robot arm 170, and may be formed as a separate component or may be integrally formed with the housing 110 (in FIG. 2).

In one embodiment of the disclosure, the length extension part 120 may be composed of a plurality of chain blocks 131 and 141. The plural chain blocks 131 and 141 may be rotatably connected to each other in a chain shape. The plural chain blocks 131 and 141 may be aligned in a row and be pulled out of the housing 110 (in FIG. 2) to thereby extend the robot arm 170. In addition, the plural chain blocks 131 and 141 may be rotated with each other and pulled into the housing 110 (in FIG. 2) to thereby return the extended robot arm 170 to its original state.

More specifically with reference to FIG. 3A, each chain block 131 or 141 may include a base 133, a protrusion 135, and a magnetic material 137.

The base 133 may be formed in the shape of a rectangular plate. When one edge of the base 133 is referred to as a first edge 133a, the edge facing the first edge 133a may be referred to as a second edge 133b, and the remaining edges may be referred to as a third edge 133c and a fourth edge 133d.

The protrusion 135 may be formed to protrude in the same direction from the first edge 133a and the second edge 133b of the base 133. The protrusion 135 may be formed to protrude from the same surface of the base 133. For example, the protrusion 135 may be formed to protrude from one surface of the base 133, and may have a '⊏' shape when viewed from the cross section cut in a direction crossing the first edge 133a and the second edge 133b. When the chain blocks 131 and 141 are connected and rotated, the protrusion 135 serves to limit the rotation direction by physically interfering with another protrusion 135 formed on a different chain block 131 or 141, and the protrusions 135 may generate a bearing force for maintaining the alignment state when the chain blocks 131 and 141 are aligned in a line.

The length extension part may be formed by repeating a structure where the third edge 133c of the base 133 of one chain block is rotatably connected to the fourth edge 133d of the base 133 of another chain block. The plural chain blocks 131 and 141 may be hinged to each other for rotation.

The length extension part 120 may include a first row chain block 130 and a second row chain block 140. That is, the length extension part 120 may be composed of two rows of chain blocks. The first row chain block 130 and the second row chain block 140 may be coupled to each other through the protrusions 135 of the first row chain block and the second row chain block 140 in direct contact.

To improve the coupling between the first row chain block 130 and the second row chain block 140, a magnetic material 137 may be disposed on the protrusion 135 of each chain block. For coupling the first row chain block 130 and the second row chain block 140, magnetic materials 137 with opposite polarities may be disposed on the protrusions 135 of the chain blocks facing each other.

With reference to the illustration of FIG. 3B, when the length extension part 120 is composed of two rows of chain blocks 130 and 140, hinge couplings can provide a support force against external forces in the forward and backward directions, the protrusions 135 of the first row chain blocks 130 physically interfering with each other can provide a support force against an external force in the downward direction, and the protrusions 135 of the second row chain blocks 140 physically interfering with each other can provide a support force against an external force in the upward direction.

As shown in FIGS. 3A and 3B, the robot arm extension device 100 (in FIG. 1) according to an embodiment of the disclosure may further include a separator 113. The first row chain blocks 130 and the second row chain blocks 140 are wound into the housing 110 (in FIG. 2) and are separated by the separator 113 at the same time, and hence the chain blocks can be easily wound inside the housing 110 (in FIG. 2).

Figure 4A:
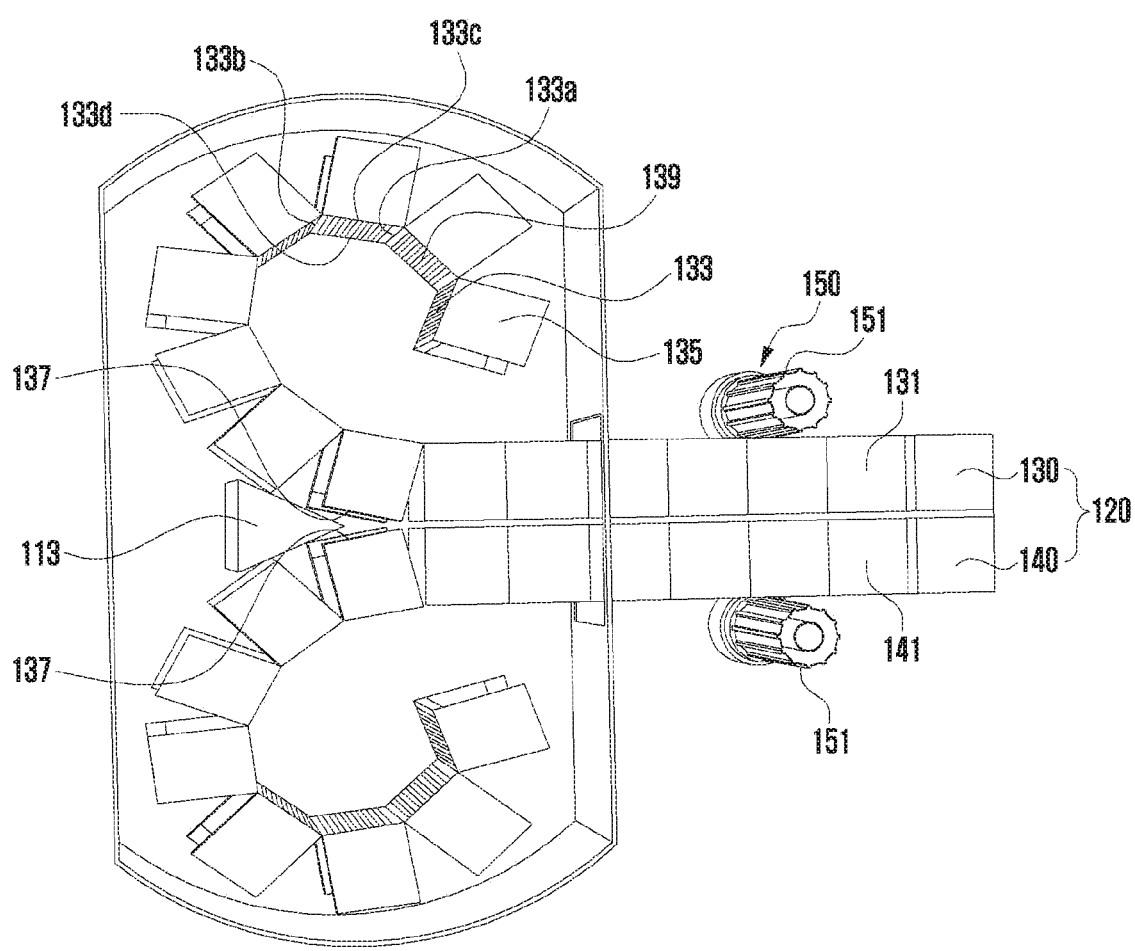
Figure 4B:
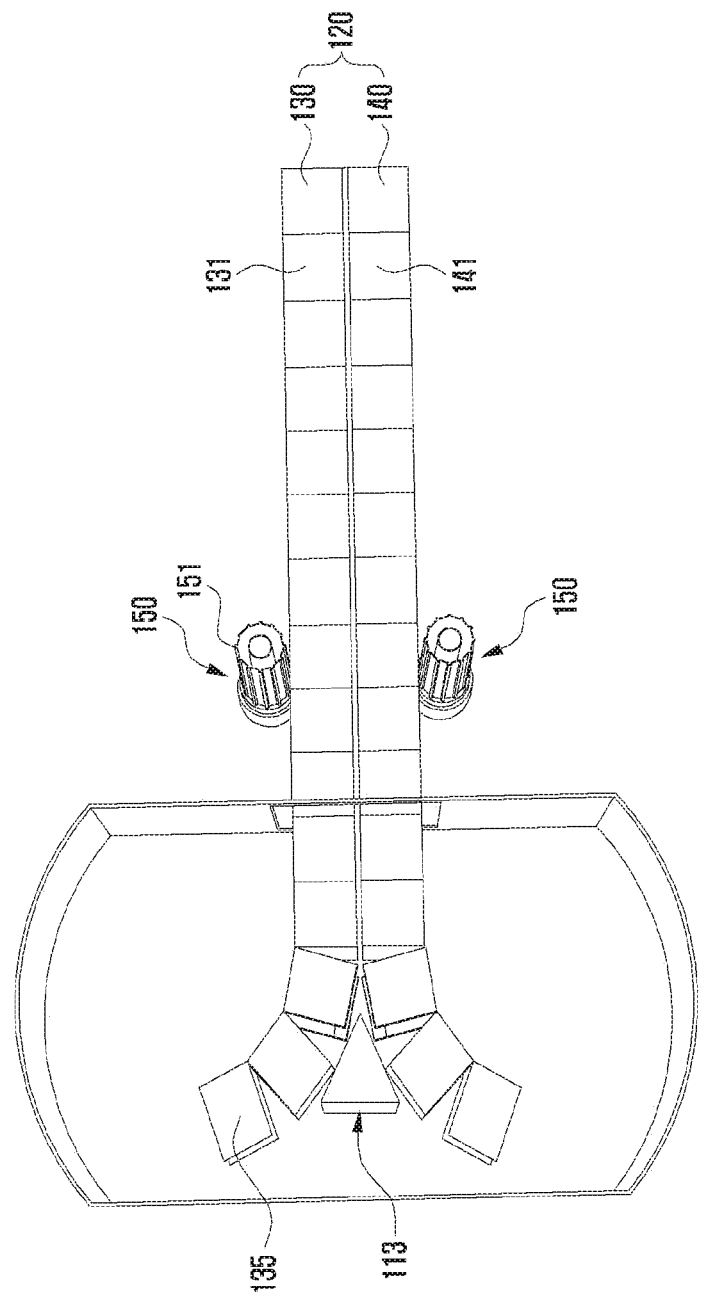

FIGS. 4A and 4B schematically show the internal structure of the robot arm extension device 100 (in FIG. 1) according to another embodiment of the disclosure.

Figure 5:
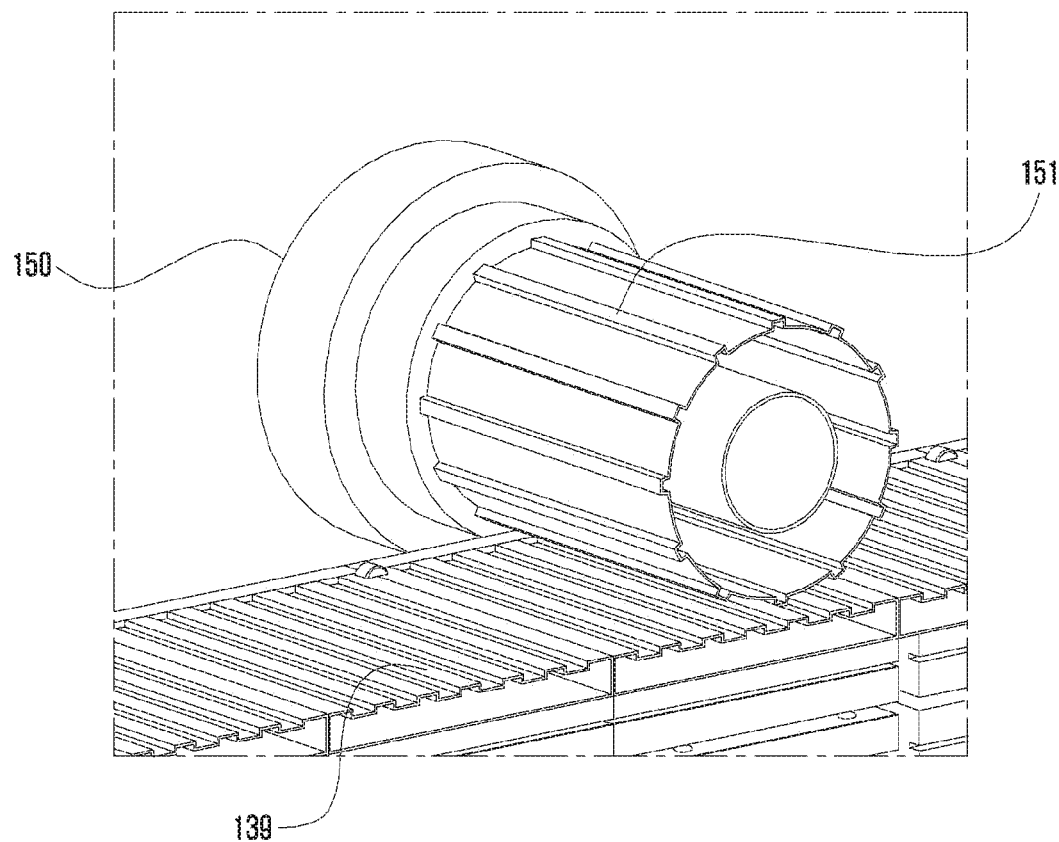
FIG. 5 illustrates the driving part of the robot arm extension device according to an embodiment of the disclosure.

FIG. 4A illustrates a state where the length extension part 120 is wound inside the housing 110 (in FIG. 2), and FIG. 4B illustrates a state where the length extension part 120 is pulled out of the housing 110 (in FIG. 2) to thereby extend the length of the robot arm 170. Comparing FIGS. 4A and 4B to FIGS. 3A and 3B, there may be a difference in the shape of the separator 113. When the separator 113 is formed in a wedge shape as shown in FIGS. 4A and 4B, the first row chain blocks 130 and the second row chain blocks 140 may be more easily separated compared with the case of FIGS. 3A and 3B, FIG. 5 illustrates the driving part 150 of the robot arm extension device 100 (in FIG. 1) according to an embodiment of the disclosure.

According to an embodiment of the disclosure, the robot arm extension device 100 (in FIG. 1) may be operated by concave-convex portions 139 formed on the other surface of the chain block base 133 and concave-convex portions 151 formed on the outer circumferential surface of the driving part 150.

In one embodiment of the disclosure, the driving part 150 may have a cylindrical roller shape, and may pull the chain blocks out of the housing 110 (in FIG. 2) or pull the chain blocks into the housing 110 (in FIG. 2) according to the rotation. The driving part 150 is illustrated as a cylindrical roller type, but it may be formed in various ways such as a gear shape.

Concave-convex portions 139 may be formed on the other surface of the base 133 of a chain block so as to cross the direction where the chain blocks are pulled out of the housing 110 (in FIG. 2).

The concave-convex portions 151 of the outer circumferential surface of the driving part 150 may be engaged with the concave-convex portions 139 formed on the chain blocks, transmitting a driving force to the chain blocks. The extraction of the chain blocks may be adjusted according to the degree of rotation of the driving part 150, which may adjust the extension length of the robot arm 170.

FIG. 6 illustrates a state where a robot arm extension device is mounted on a robot according to another embodiment of the disclosure, and FIG. 7 illustrates a coupling portion between the robot arm extension device and the robot.

In the description on the robot arm extension device according to another embodiment of the disclosure, the same reference numerals are used for the same elements as in the embodiment of FIGS. 1 to 5, and the explanation focuses on the difference without repeating identical descriptions.

With reference to FIGS. 6 and 7, the robot arm extension device may be connected to the end of the robot arm through a component such as an adapter 111. The adapter 111 may be formed in various ways corresponding to the shape of the end of the robot arm where it is mounted. The adapter 111 may be formed as a separate component or may be integrally formed with the length extension part 220 of the robot arm extension device.

Figure 8A:
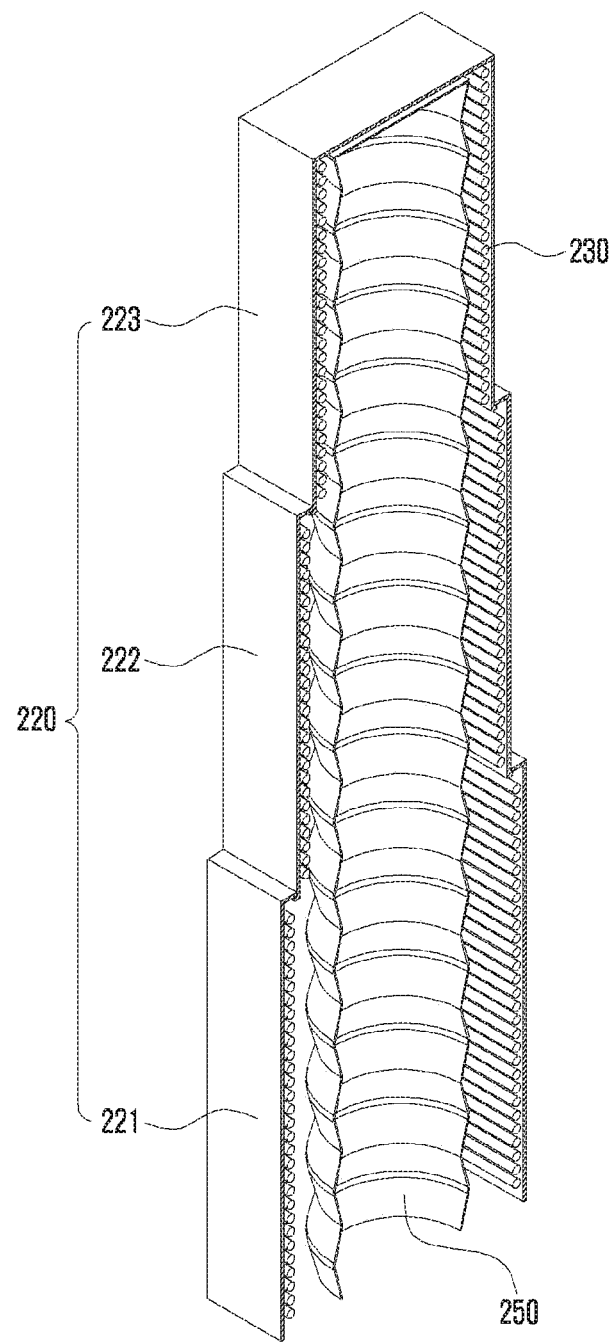
FIGS. 8A and 8B schematically show the internal structure of the robot arm extension device according to another embodiment of the disclosure.
Figure 8B:
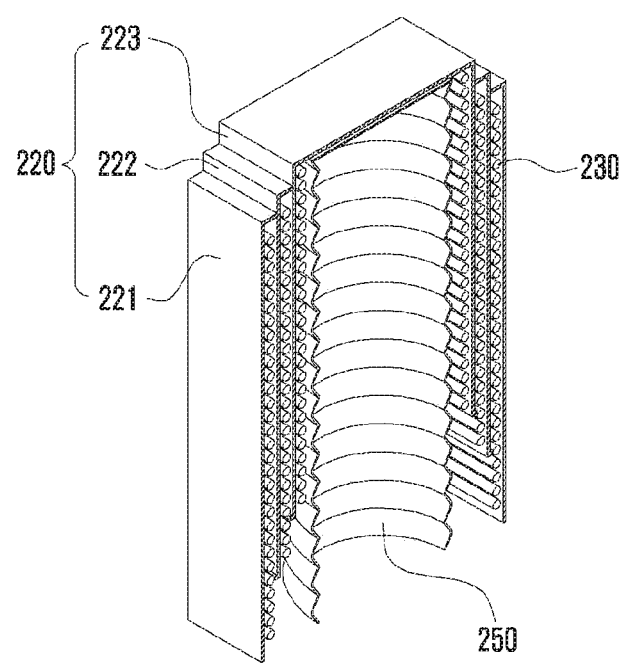

FIGS. 8A and 8B schematically show the internal structure of the robot arm extension device according to another embodiment of the disclosure.

With reference to FIGS. 8A and 8B, the robot arm extension device according to another embodiment of the disclosure may include an adapter 111 (in FIG. 7), a length extension part 220, and a driving part 250.

The length extension part 220 may be composed of a plurality of extension tubes. The plural extension tubes may be formed to be slidably inscribed. In FIG. 8, the length extension part 220 is depicted as including first to third extension tubes 221 to 223, but it may include two or four or more extension tubes without being limited thereto.

When the first extension tube 221 refers to the extension tube of the largest diameter, the first to third extension tubes 221 to 223 may be coupled together so that the outer circumferential surface of the second extension tube 222 is in contact with the inner circumferential surface of the first extension tube 221, the outer circumferential surface of the third extension tube 223 is in contact with the inner circumferential surface of the second extension tube 222, and the second extension tube 222 and the third extension tube 223 can be slidably moved to extend the length of the robot arm. FIG. 8A may indicate a state where the first to third extension tubes 221 to 223 are extended to the maximum length, and FIG. 8B may indicate a state where the first to third extension tubes 221 to 223 are contracted to the minimum length.

Plain bearings may be disposed on the contact surface between the first extension tube 221 and the second extension tube 222 or on the contact surface between the second extension tube 222 and the third extension tube 223. These plain bearings can reduce the frictional force on the contact surface between the first extension tube 221 and the second extension tube 222 or on the contact surface between the second extension tube 222 and the third extension tube 223, so that the slide movement between the extension tubes can be performed smoothly.

In another embodiment of the disclosure, the driving part 250 may be composed of a. corrugated pipe 250 and a pneumatic pump (not shown).

As shown in FIG. 8A, the corrugated pipe 250 may be disposed to penetrate the first to third extension tubes 221 to 223, and the first to third extension tubes 221 to 223 may be extended to the maximum length when the air is blown into the inside of the corrugated pipe 250 by using the pneumatic pump (not shown). On the contrary, when the air is removed from the inside of the corrugated pipe 250 by using the pneumatic pump (not shown), the first to third extension tubes 221 to 223 may be contracted as shown in FIG. 8B.

Figure 9:
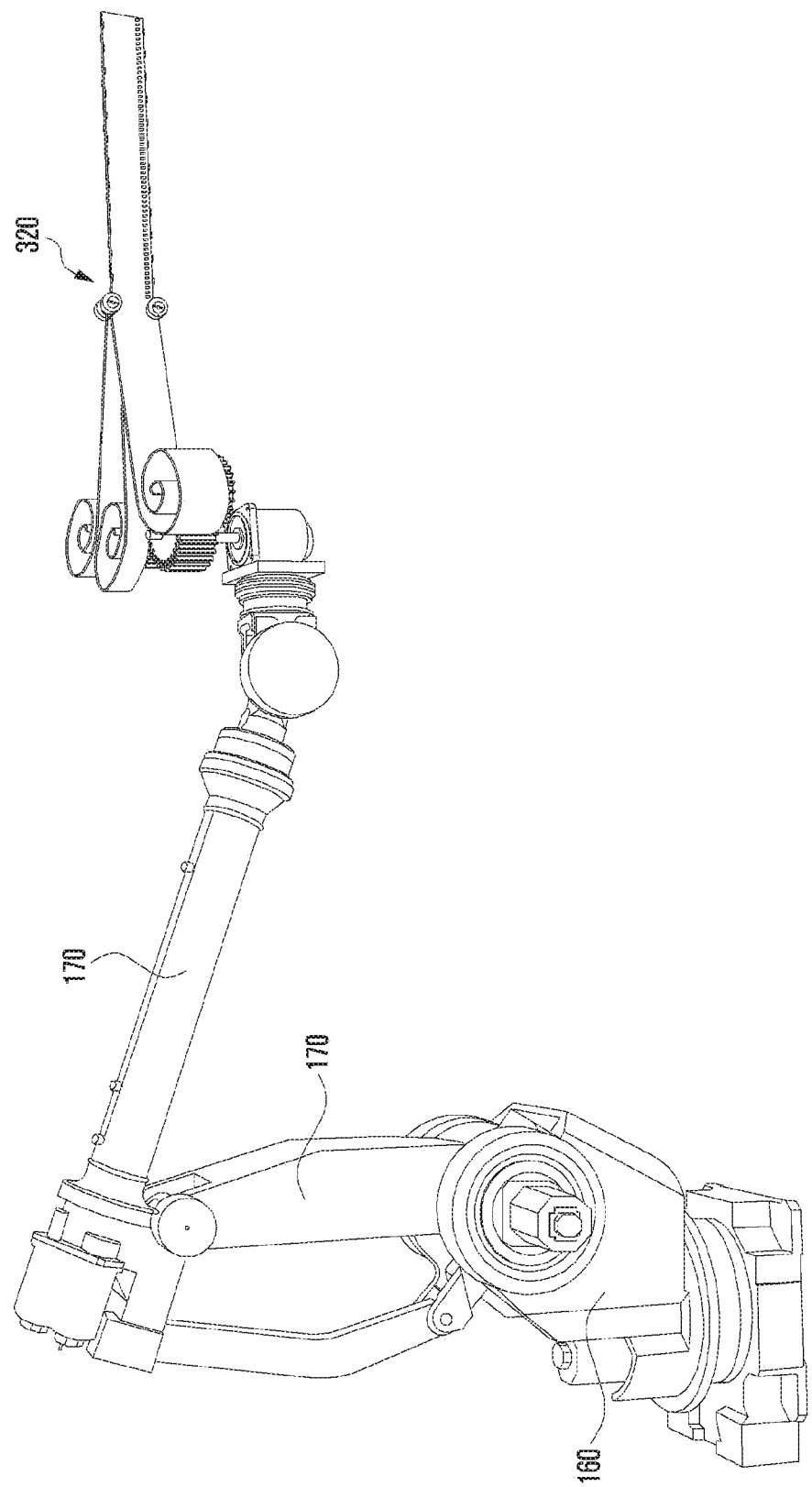
FIG. 9 illustrates a state where a robot arm extension device is mounted on a robot according to another embodiment of the disclosure.
Figure 10:
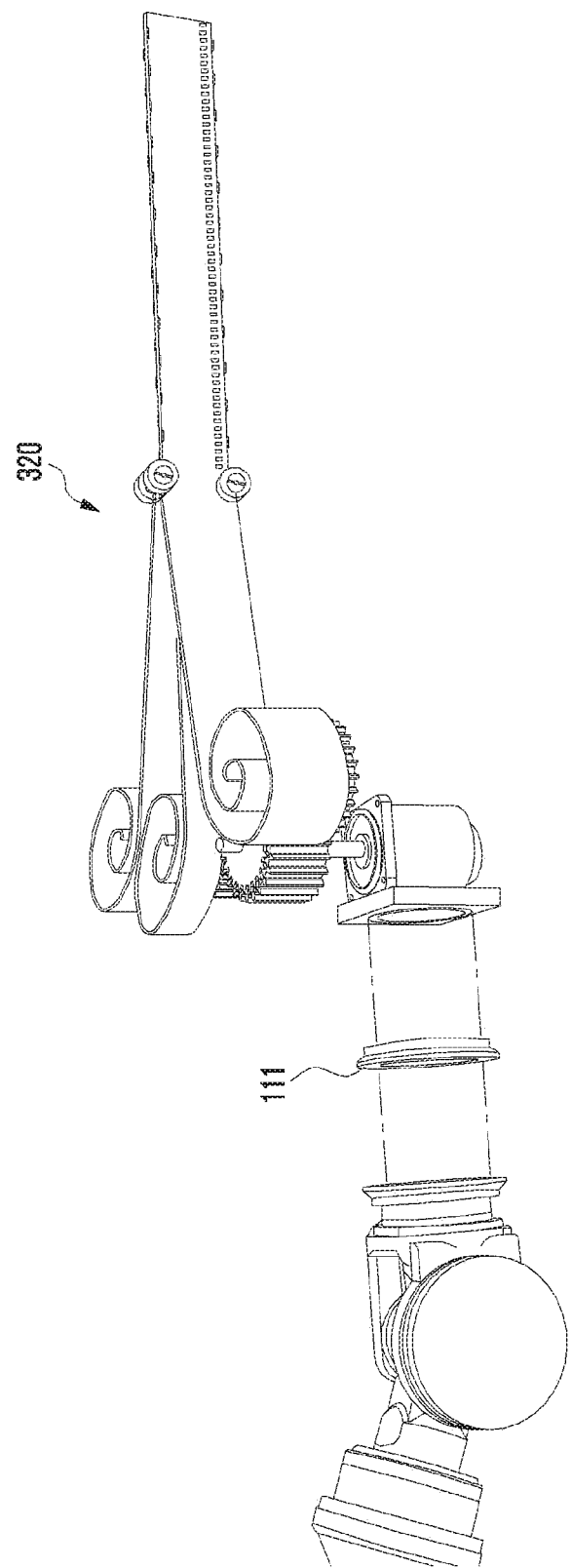
FIG. 10 illustrates a coupling portion between the robot arm extension device and the robot according to another embodiment of the disclosure.

FIG. 9 illustrates a state where a robot arm extension device is mounted on a robot according to another embodiment of the disclosure, and FIG. 10 illustrates a coupling portion between the robot arm extension device and the robot.

In the description on the robot arm extension device according to another embodiment of the disclosure, the same reference numerals are used for the same elements as in the embodiment of FIGS. 1 to 5, and the explanation focuses on the difference without repeating identical descriptions.

With reference to FIGS. 9 and 10, the robot arm extension device may be connected to the end of the robot arm through a component such as an adapter 111. The adapter 111 may be formed in various ways corresponding to the shape of the end of the robot arm where it is mounted.

Figure 11:
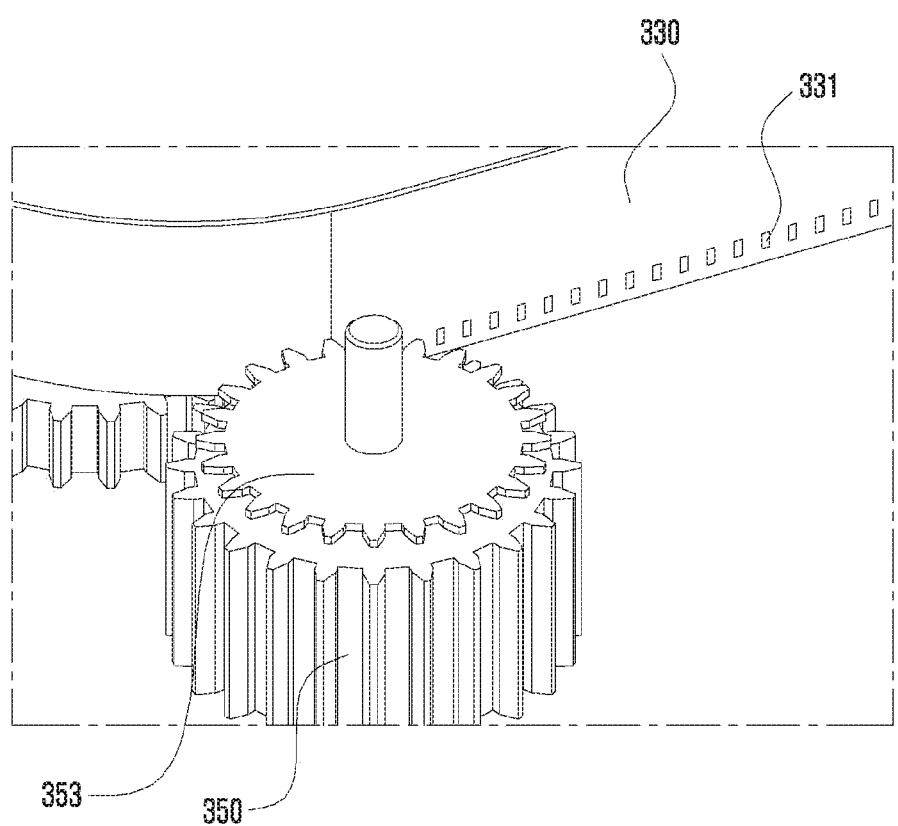
FIGS. 11 and 12 illustrate the driving part of the robot arm extension device according to another embodiment of the disclosure.
Figure 12:
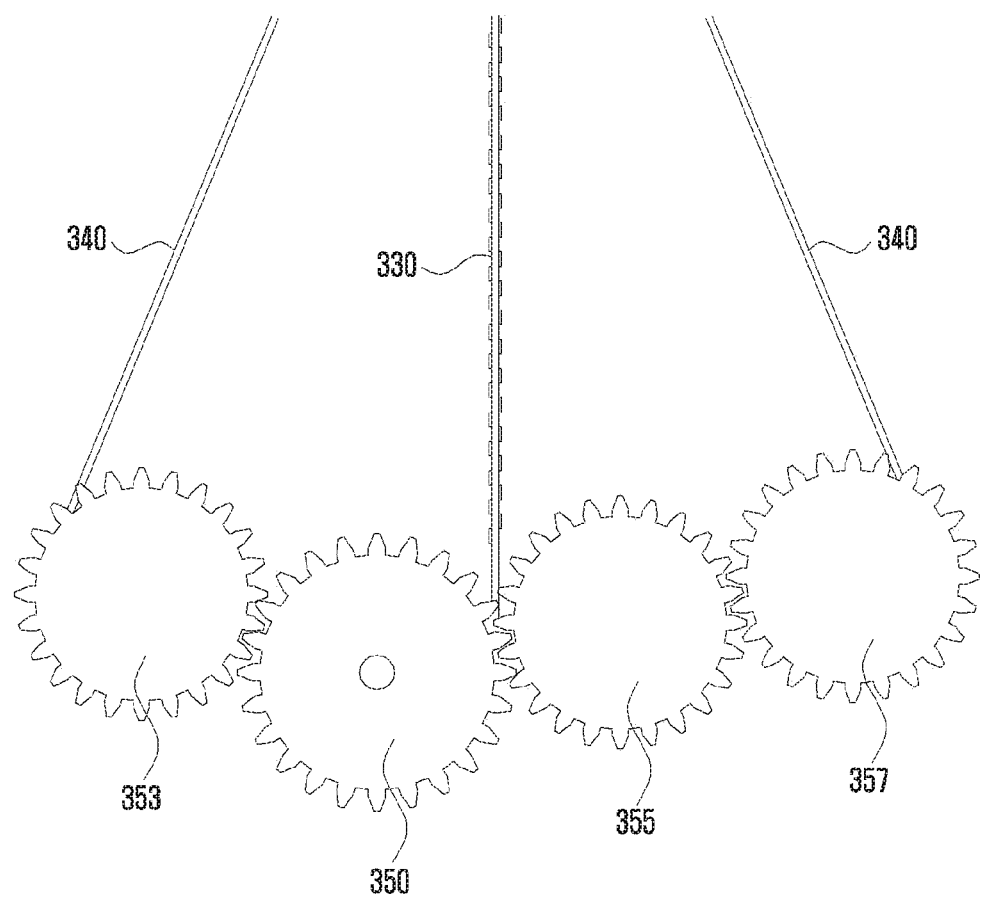

FIGS. 11 and 12 illustrate the driving part 350 of the robot arm extension device according to another embodiment of the disclosure.

With reference to FIG. 11, the robot arm extension device according to another embodiment of the disclosure may include an adapter 111 (in FIG. 10), a length extension part 320, and a driving part 350.

The length extension part 320 may be composed of a plurality of flexible metal plates. The flexible metal plate may have a shape of a long tape and may be wound or unwound according to the operation of the driving part 350 to be described later. The length extension part 320 may include a central flexible metal plate 330, a first auxiliary flexible metal plate 341 and a second auxiliary flexible metal plate 343. The central flexible metal plate 330 may have holes formed at regular intervals, and may include protrusions alternately formed at both ends in the width direction. The other sides of the central flexible metal plate 330, the first auxiliary flexible metal plate 341, and the second auxiliary flexible metal plate 343 may be fixed to each other.

In another embodiment of the disclosure, the driving part 350 may be composed of a first to fourth driving gears 350 to 357 and a first auxiliary gear 351. The first to fourth driving gears 350 to 357 may be gears of the same ratio. The first auxiliary gear 351 and the first driving gear 350 may share a rotation axis and may rotate at the same rotation speed. With reference to the illustration of FIG. 11, one side of the central flexible metal plate 330 may be wound around the third driving gear 355 in the clockwise direction. One side of the first auxiliary flexible metal plate 341 may be wound around the second driving gear 353 in the clockwise direction. One side of the second auxiliary flexible metal plate 343 may be wound around the fourth driving gear 357 in the counterclockwise direction.

For example, when the first driving gear 350 is rotated in the counterclockwise direction by the motor, the third driving gear 355 is rotated in the clockwise direction and the central flexible metal plate 330 having been wound is unwound. As the first driving gear 350 is rotated, the second driving gear 353 is rotated in the clockwise direction, the fourth driving gear 357 is rotated in the counterclockwise direction, and the first auxiliary flexible metal plate 341 and the second auxiliary flexible metal plate 343 are also unwound.

When the central flexible metal plate 330, the first auxiliary flexible metal plate 341, and the second auxiliary flexible metal plate 343 are fixed to each other at the other side, as the central flexible metal plate 330 is unwound, the first auxiliary flexible metal plate 341 and the second auxiliary flexible metal plate 343 may also be unwound.

The unwound first auxiliary flexible metal plate 341 and second auxiliary flexible metal plate 343 may be inserted into the protrusions formed in the width direction in the central flexible metal plate 330 and become integrated. This can withstand well the external force applied in the upward or downward direction with reference to the illustration of FIG. 11. With reference to FIG. 12, the first auxiliary gear 351 is inserted into the holes of the central flexible metal plate 330 and may wind the central flexible metal plate 330 around the third driving gear 355 or unwind it from the third driving gear 355 according to the rotation of the first driving gear 350.

According to an embodiment of the disclosure, the robot arm extension device may include: a housing; an adapter formed at one side of the housing and connected to the robot; a length extension part embedded in the housing and configured to be pulled out of or pulled into the housing; and a driving part configured to provide a driving force for pulling the length extension part out of or into the housing.

The length extension part may be composed of a plurality of chain blocks, and the chain blocks may be rotatably connected to each other. The chain blocks may be aligned in a straight line and be pulled out of the housing or be wound and pulled into the housing according to the driving of the driving part.

Each of the chain blocks may include: a base in the shape of a square plate; and a protrusion formed to protrude from one surface of the base at a first edge and a second edge facing the first edge. While the protrusions are aligned in the same direction, a third edge of the base may be rotatably connected to a fourth edge of another chain block.

The length extension part may be composed of a first row chain block and a second row chain block. When the protrusion of the first row chain block is directly coupled to the protrusion of the second row chain block, the length extension part may be pulled out of the housing.

A magnetic material is disposed at the end of the protrusion so that the first row chain block and the second row chain block may be coupled to each other.

The third edge of the base of one chain block may be rotatably hinged to the fourth edge of the base of another chain block.

A concave-convex portion is formed on the other surface of the base so as to cross the direction where the chain block is pulled out of the housing.

The robot arm extension device may further include a separator disposed in the housing wherein the separator may separate the first row chain block and the second row chain block when the first row chain block and the second row chain block are wound into the housing.

The driving part is of a roller type and may drive the length extension part through rotation in contact with the other surface of the base.

Concave-convex portions are formed on the outer circumferential surface of the driving part.

According to an embodiment of the disclosure, the robot may include: a main body; a robot arm connected to the main body and configured to perform rotational motion or translational motion; a housing connected to an end of the robot arm through an adapter; a length extension part embedded in the housing and configured to be pulled out of or pulled into the housing; and a driving part configured to provide a driving force to the length extension part.

The length extension part may be composed of a plurality of chain blocks, and the chain blocks may be rotatably connected to each other. The chain blocks may be aligned in a straight line and be pulled out of the housing or be wound and pulled into the housing according to the driving of the driving part.

Each of the chain blocks may include: a base in the shape of a square plate; and a protrusion formed to protrude from one surface of the base at a first edge and a second edge facing the first edge. While the protrusions are aligned in the same direction, a third edge of the base may be rotatably connected to a fourth edge of another chain block.

The length extension part may be composed of a first row chain block and a second row chain block. When the protrusion of the first row chain block is directly coupled to the protrusion of the second row chain block, the length extension part may be pulled out of the housing.

A magnetic material is disposed at the end of the protrusion so that the first row chain block and the second row chain block may be coupled to each other.

The third edge of the base of one chain block may be rotatably hinged to the fourth edge of the base of another chain block.

A concave-convex portion is formed on the other surface of the base so as to cross the direction where the chain block is pulled out of the housing.

A separator is further included in the housing wherein the separator may separate the first row chain block and the second row chain block when the first row chain block and the second row chain block are wound into the housing.

The driving part is of a roller type and may drive the length extension part through rotation in contact with the other surface of the base.

Concave-convex portions are formed on the outer circumferential surface of the driving part.

The invention claimed is:

1. A robot arm extension device comprising:
   a housing;
   an adapter formed at one side of the housing and connected to a robot;
   a length extension part embedded in the housing and configured to be pulled out of or pulled into the housing; and
   a driving part configured to provide a driving force for pulling the length extension part out of or into the housing,
   wherein the length extension part includes a first row chain block and second row chain block, and
   wherein the first row chain block includes a plurality of first chain blocks and the second row chain block includes a plurality of second chain blocks, and wherein the plurality of first chain blocks are rotatably coupled with each other and the plurality of second chain blocks are rotatably coupled with each other,
   wherein the first and second chain blocks are aligned in a straight line so that the first and the second chain blocks are pulled out of the housing,
   wherein the first and second chain blocks are each oppositely wound so that the first and the second chain blocks are pulled into the housing,
   wherein the plurality of first chain blocks includes a first magnetic material and the plurality of second chain blocks includes a second magnetic material,
   wherein each of the respective first and second chain blocks includes:
      a base in the shape of a square plate; and
      a protrusion formed to protrude from a first surface of the base at a first edge and a second edge facing the first edge,
   wherein a third edge of the base is rotatably connected to a fourth edge of an adjacent chain block while the protrusions are being aligned in the first direction, and
   wherein, when the protrusion of the first row chain block is directly coupled to the protrusion of the second row chain block via the first and second magnetic materials, the length extension part is pulled out of the housing.

2. The robot arm extension device of claim 1, wherein the magnetic material is disposed at the end of the protrusion.

3. The robot arm extension device of claim 1, wherein the third edge of the base of one chain block is rotatably hinged to the fourth edge of the base of another chain block.

4. The robot arm extension device of claim 1, wherein a concave-convex portion is formed on a second surface of the base so as to cross the direction where the chain block is pulled out of the housing, wherein the second surface is an opposite surface of the first surface.

5. The robot arm extension device of claim 1, further comprising a separator disposed in the housing, and wherein the separator separates the first row chain block and the second row chain block when the first row chain block and the second row chain block are wound into the housing.

6. The robot arm extension device of claim 1, wherein the driving part is of a roller type and drives the length extension part through rotation in contact with a second surface of the base, wherein the second surface is an opposite surface of the first surface.

7. The robot arm extension device of claim 6, wherein concave-convex portions are formed on the outer circumferential surface of the driving part.

8. A robot comprising:
   a main body;
   a robot arm connected to the main body and configured to perform rotational motion or translational motion;
   a housing connected to an end of the robot arm through an adapter;
   a length extension part embedded in the housing and configured to be pulled out of or pulled into the housing; and
   a driving part configured to provide a driving force to the length extension part,
   wherein the length extension part includes a first row chain block and second row chain block,
   wherein the first row chain block includes a plurality of first chain blocks and the second row chain block includes a plurality of second chain blocks, and wherein the plurality of first chain blocks are rotatably coupled with each other and the plurality of second chain blocks are rotatably coupled with each other,
   wherein the first and second chain blocks are aligned in a straight line so that the first and the second chain blocks are pulled out of the housing,
   wherein the first and second chain blocks are each oppositely wound so that the first and the second chain blocks are pulled into the housing,
   wherein the plurality of first chain blocks includes a first magnetic material and the plurality of second chain blocks includes a second magnet material,
   wherein each of the respective first and second chain blocks includes:
      a base in the shape of a square plate; and
      a protrusion formed to protrude from a first surface of the base at a first edge and a second edge facing the first edge,
   wherein a third edge of the base is rotatably connected to a fourth edge of an adjacent chain block while the protrusions are being aligned in the first direction, and
   wherein, when the protrusion of the first row chain block is directly coupled to the protrusion of the second row chain block via the first and second magnetic materials, the length extension part is pulled out of the housing.

9. The robot of claim 8, wherein the magnetic material is disposed at the end of the protrusion.

* * * * *